US011235830B2

(12) United States Patent
Lechevallier et al.

(10) Patent No.: US 11,235,830 B2
(45) Date of Patent: Feb. 1, 2022

(54) STEERER TUBE PROTECTOR

(71) Applicant: Specialized Bicycle Components, Inc., Morgan Hill, CA (US)

(72) Inventors: Robin François Ramon Lechevallier, Cham (CH); Jan Talavasek, Knonau (CH); Marco Werner Sonderegger, Benzenschwil (CH); David Huwiler, Baar (CH); Rudy Megevand, Oberageri (CH)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 211 days.

(21) Appl. No.: 16/448,879

(22) Filed: Jun. 21, 2019

(65) Prior Publication Data

US 2020/0398921 A1    Dec. 24, 2020

(51) Int. Cl.
*B62J 23/00* (2006.01)
*B62J 99/00* (2020.01)
*B62K 19/32* (2006.01)
*B62K 21/02* (2006.01)
*B62J 45/00* (2020.01)
*B62M 6/55* (2010.01)

(52) U.S. Cl.
CPC ............... *B62J 23/00* (2013.01); *B62J 99/00* (2013.01); *B62K 19/32* (2013.01); *B62K 21/02* (2013.01); *B62J 45/00* (2020.02); *B62M 6/55* (2013.01)

(58) Field of Classification Search
CPC . B62J 23/00; B62J 45/00; B62J 99/00; B62K 19/32; B62K 21/02
See application file for complete search history.

(56) References Cited

U.S. PATENT DOCUMENTS

| 4,768,798 | A  | * | 9/1988  | Reed ................. B62J 11/19 280/281.1 |
| 7,810,614 | B1 | * | 10/2010 | Li .................... B60T 11/06 188/20 |
| 7,837,212 | B2 |   | 11/2010 | D'Aluisio |

(Continued)

FOREIGN PATENT DOCUMENTS

| EP | 3552938 A1  | 10/2019 |
| GB | 2444356 A   | 6/2008  |
| JP | S59109592 U | 7/1984  |

OTHER PUBLICATIONS

Extended European Search Report issued by the European Patent Office for Application No. 20180916.7 dated Oct. 14, 2020 (9 pages).

(Continued)

*Primary Examiner* — Minnah L Seoh
*Assistant Examiner* — Michael R Stabley
(74) *Attorney, Agent, or Firm* — Michael Best & Friedrich LLP

(57) ABSTRACT

An bicycle includes a frame assembly having a head tube and a fork having a steerer tube mounted for rotation in the head tube. The bicycle further includes wheels supporting the frame assembly, and a component line positioned at least partially in the head tube and between the head tube and the steerer tube. The bicycle further includes a protector positioned in the head tube and separating the component line from the steerer tube.

20 Claims, 5 Drawing Sheets

(56) References Cited

U.S. PATENT DOCUMENTS

| | | | |
|---|---|---|---|
| 8,662,519 B2* | 3/2014 | Domahidy | B60T 11/046 |
| | | | 280/288.4 |
| 9,056,646 B1* | 6/2015 | D'Aluisio | B62K 19/06 |
| 9,409,618 B2* | 8/2016 | Lanz | B62K 21/06 |
| 9,615,472 B1* | 4/2017 | Calfee | H05K 5/0217 |
| 2010/0194073 A1* | 8/2010 | Corbin | B60T 11/043 |
| | | | 280/279 |
| 2013/0241169 A1 | 9/2013 | Talavasek et al. | |
| 2014/0375017 A1 | 12/2014 | Poss | |
| 2015/0298759 A1 | 10/2015 | Lanz | |

OTHER PUBLICATIONS

Examination Report issued from the European Patent Office for related Application No. 20 180 916.7 dated Sep. 13, 2021 (9 Pages).

* cited by examiner

STEERER TUBE PROTECTOR

BACKGROUND

The present invention relates generally to the field of bicycles, and specifically to the head tube of a bicycle and to the steerer tube that is inserted into the head tube.

Bicycles, including electric bicycles ("e-bikes"), commonly include a frame assembly having a head tube into which a steerer tube of a fork is inserted. When component lines and/or component line housings are routed within the frame assembly, the component lines and/or component line housings sometimes are routed through the head tube. However, if the component lines and/or component line housings contact the steerer tube, the component lines, the component line housings, and/or the steerer tube (e.g., an exterior surface of the steerer tube) may be damaged over time.

DETAILED DESCRIPTION

In some embodiments, a bicycle includes a frame assembly having a head tube and a fork having a steerer tube mounted for rotation in the head tube. The bicycle further includes wheels supporting the frame assembly, and a component line positioned at least partially in the head tube and between the head tube and the steerer tube. The bicycle further includes a protector positioned in the head tube and separating the component line from the steerer tube.

In yet other embodiments, a protector includes a resilient sheet having an upper edge and a lower edge and at least one of: at least one first retraction feature adjacent each of to the upper edge and lower edges of the resilient sheet; or at least one second retraction feature adjacent to the lower edge. The protector can be configured to be positioned in a head tube of a bicycle between a steerer tube and a component line.

Other elements of the invention will become apparent by consideration of the detailed description and drawings.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
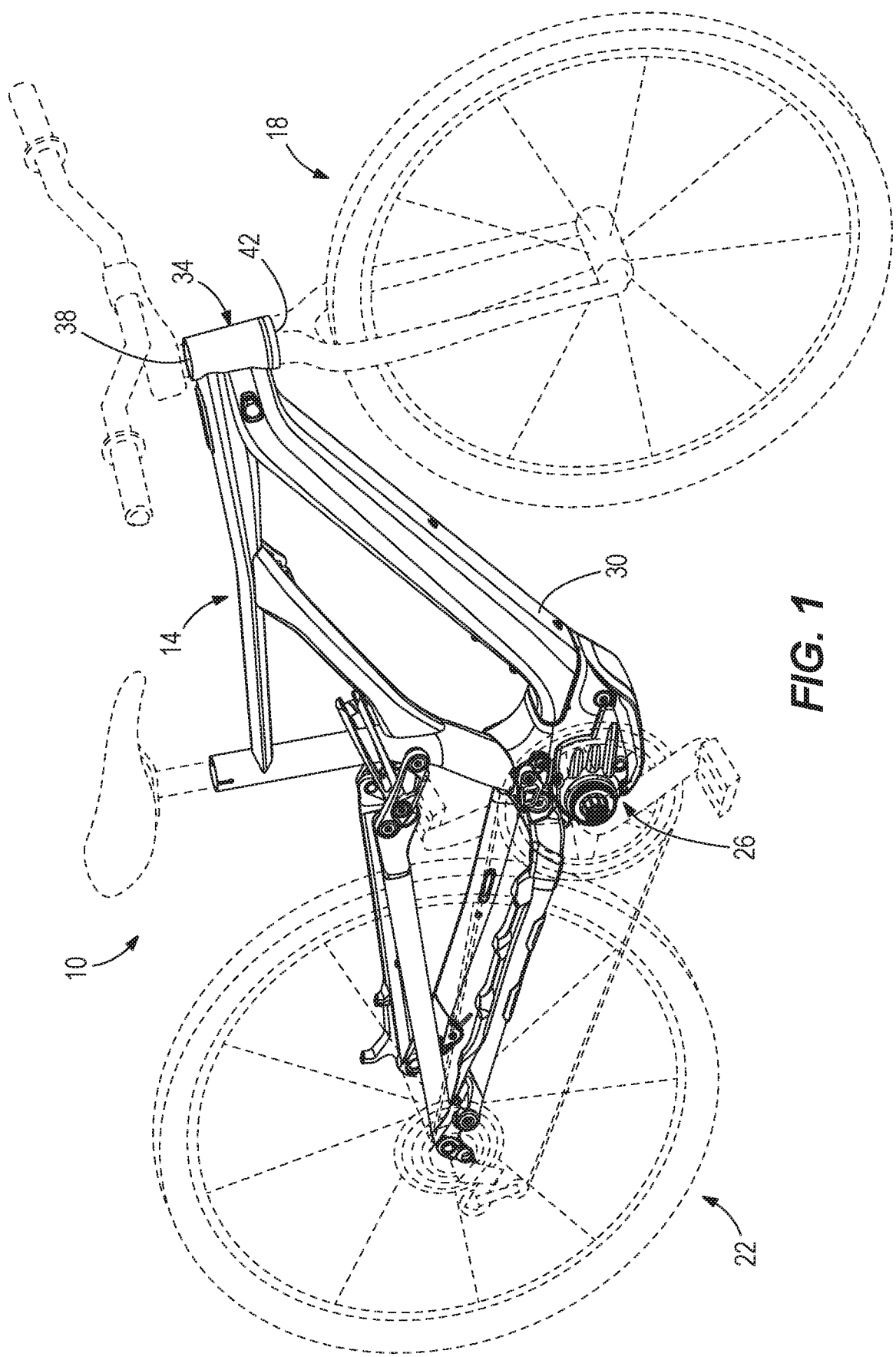
FIG. 1 is a perspective view of a bicycle, according to an embodiment.

Referring to the drawings, FIG. 1 is a perspective view of a bicycle 10, according to an embodiment. In many embodiments, and as illustrated at FIG. 1, the bicycle 10 can comprise an electric bicycle (e-bike). For example, the bicycle 10 can comprise a pedal-assist e-bike and/or a power-on-demand e-bike. In some embodiments, the bicycle 10 can comprise a pedal-assist e-bike and not a power-on-demand e-bike, or vice versa. In other embodiments, the bicycle 10 can comprise a manual (e.g., non-electric) bicycle.

The bicycle 10 includes a frame assembly 14, a first wheel 18 coupled to and supporting the frame assembly 14, and a second wheel 22 coupled to and supporting the frame assembly 14. In some embodiments, the bicycle 10 includes a motor assembly 26 coupled to the frame assembly 14. The motor assembly 26 can be operable to provide motive power to the bicycle 10. For example, the motor assembly 26 can generate motive power from electricity supplied to the motor assembly 26 by a battery of the bicycle 10, and can supply the motive power to a drivetrain of the bicycle 10. In many embodiments, and as illustrated in FIG. 1, the motor assembly 26 can be located generally at a lower portion of the frame assembly 14 and the bicycle 10, although, in other embodiments, the motor assembly 26 can be located elsewhere at the frame assembly 14 and the bicycle 10.

In many embodiments, the frame assembly 14 includes a head tube 34. The head tube 34 can include a first end 38 and a second end 42 opposite the first end 38. In some embodiments, the head tube 34 can taper between the first end 38 and the second end 42, such as, for example, such that the first end 38 has a smaller diameter than the second end 42. In other embodiments, the head tube 34 can be configured with different shapes, sizes, and/or tapers than the head tube 34 as illustrated. For example, in some embodiments, the head tube 34 is cylindrical and/or does not taper.

In many embodiments, the frame assembly 14 can include a downtube 30. In many embodiments, the downtube 30 can extend up and/or away from the motor assembly 26. In some embodiments, the downtube 30 may house and enclose a battery (not illustrated) configured to supply electricity to the motor assembly 26.

In some embodiments, the head tube 34 can be coupled to the downtube 30. For example, the head tube 34 and the downtube 30 can be mechanically coupled (e.g. fastened by one or more fasteners) or integrally coupled (e.g., welded or integrally formed) together. In further embodiments, the head tube 34 can be coupled to an upper end of the downtube 30.

In these or other embodiments, the motor assembly 26 can be coupled to the downtube 30. In further embodiments, the motor assembly 26 can be coupled to a lower end of the downtube 30.

Figure 2:
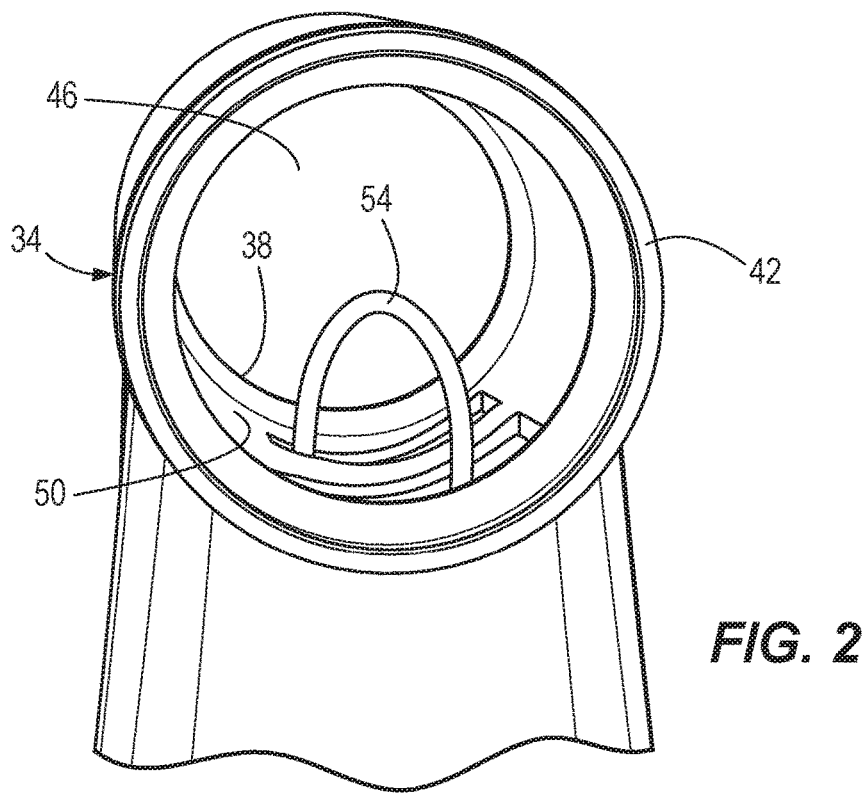
FIG. 2 is a bottom view of a head tube of the bicycle of FIG. 1, looking up through an interior passage of the head tube.

Referring now to FIG. 2, in many embodiments, the head tube 34 can be hollow, and includes an interior passage 46. The interior passage 46 can extend through the head tube 34 between the first end 38 and the second end 42. The interior passage 46 can be sized and shaped to receive a steerer tube of a fork of the bicycle 10 (FIG. 1). The interior passage 46 can be defined at least in part by an interior surface 50 of the head tube 34. For example, the interior surface 50 can include an inner circumferential surface of the head tube 34.

Figure 5:
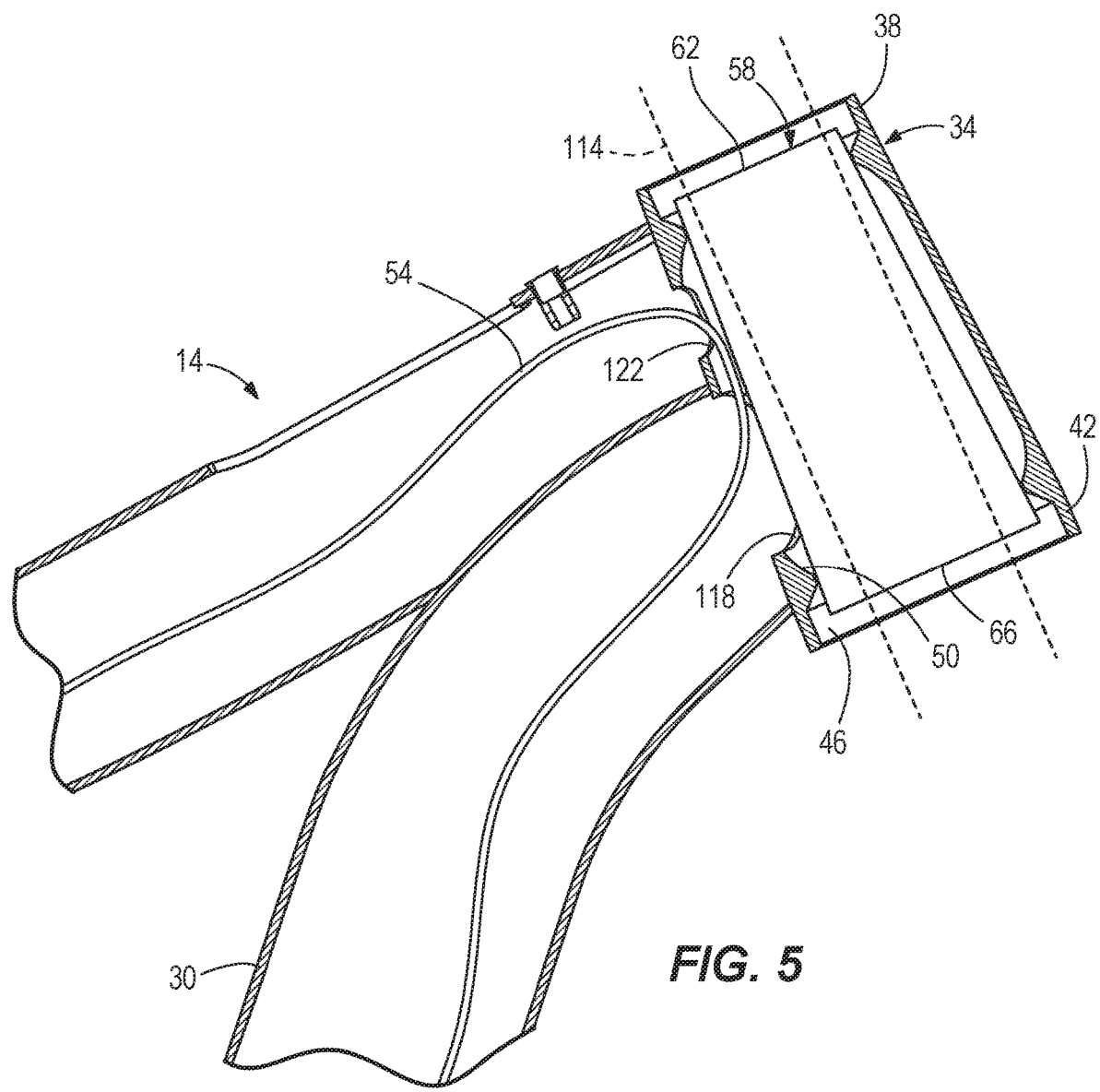
FIG. 5 is a cross-sectional view of the head tube of FIG. 1, illustrating the protector of FIGS. 3 & 4 disposed within the head tube in the second, rolled configuration of FIG. 4.

Referring now to FIGS. 2 & 5, in many embodiments, the bicycle 10 (FIG. 1) can include one or more component lines. The component line(s) can be configured to control, electricity, and/or communicate with one or more component(s) of the bicycle 10 (FIG. 1). Exemplary component line(s) can include one or more control cables (e.g., one or more brake cables, one or more brake hoses, one or more shift cables, etc.), one or more electrical cables, one or more data cables, etc. The component line(s) can extend at least partially into an interior of the frame assembly 14.

Further, in some embodiments, the bicycle 10 (FIG. 1) can include one or more component line housings. For example, the component line housing(s) each can comprise a flexible sheath or other elongate, resilient structure. The component line housing(s) can house, protect, and/or route one or more of the component line(s) of the bicycle 10 (FIG. 1). In some embodiments, one or more of the component line housing(s) can house, protect, and/or route multiple component lines of the component line(s) of the bicycle 10 (FIG. 1). In these or other embodiments, one or more of the component line housing(s) can house, protect, and/or route individual component lines of the component line(s) of the bicycle 10 (FIG. 1). The component line housing(s) can extend at least partially into an interior of the frame assembly 14. In some embodiments, one or more of the component line housing(s) can be omitted.

For example, in many embodiments, and as illustrated at FIGS. 2 & 5, the bicycle 10 (FIG. 1) can include a component line housing 54 extending at least partially into the interior passage 46 of the head tube 34. The component line housing 54 can be similar or identical to one of the component line housing(s) described above. For example, the component line housing 54 can house, protect, and/or route one or more component line(s) of the bicycle 10. In some embodiments, the cable housing 54 can be routed from the downtube 30, into the head tube 34, and then further into another portion (e.g., a top tube) of the frame assembly 14.

Figure 3:
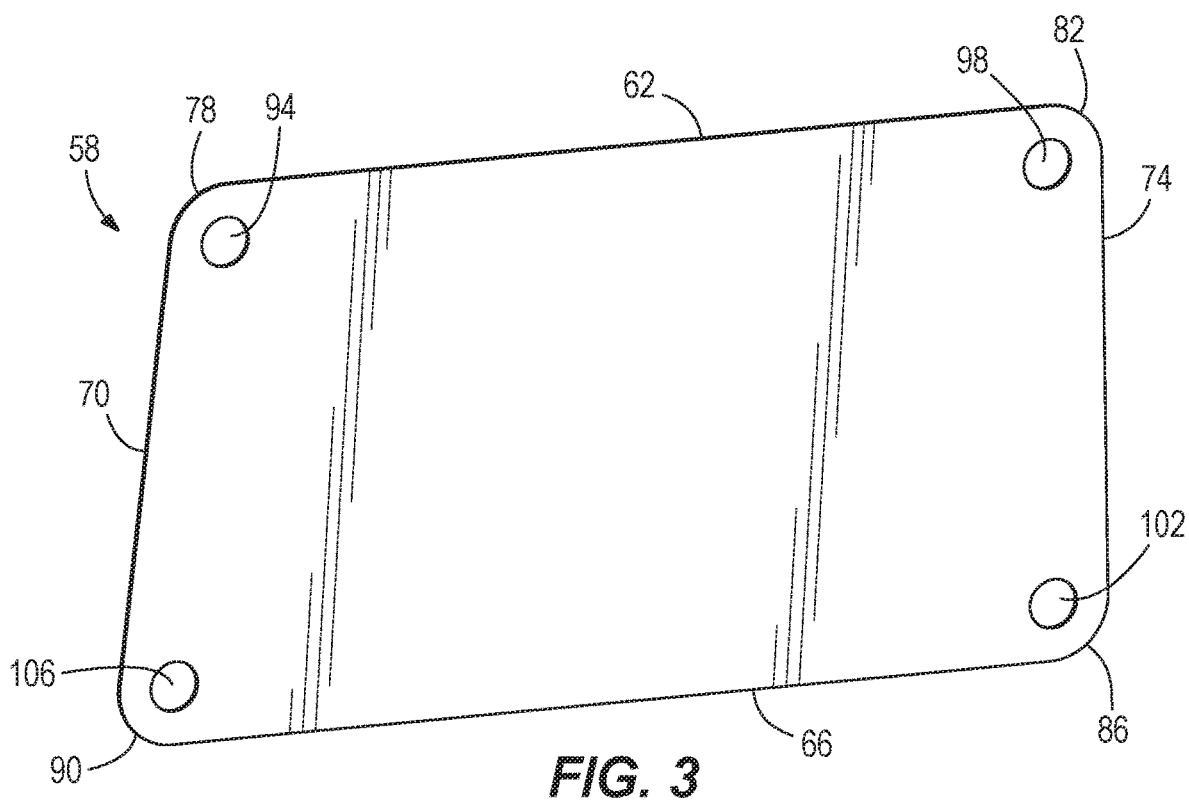
FIG. 3 is a perspective view of a protector of the bicycle of FIG. 1 in a flat, first configuration.

Referring to FIG. 3, the bicycle 10 includes a protector 58. As further explained below, in many embodiments, the protector 58 can protect one or more of the component line(s) and/or component line housing(s) of bicycle 10. Further, in these or other embodiments, the protector 58 can protect one or more surfaces of the frame assembly 14.

In many embodiments, the protector 58 can protect the component line housing 54 within the head tube 34 from damage resulting from contact of the component line housing 54 with the head tube 34 and/or a steerer tube of the bicycle 10 (FIG. 1). Further, the protector 58 can protect a steerer tube (e.g., an exterior of a steerer tube) of a fork of the bicycle 10 (FIG. 1) from damage resulting from contact of the component line housing 54 with the steerer tube. For example, contact of the component line housing 54 with the steerer tube of the bicycle 10 (FIG. 1) may result in damage to paint on the steerer tube.

In many embodiments, the protector 58 includes a thin sheet. For example, the thin sheet can comprise a flexible material, such as, for example, a flexible plastic material or another suitable flexible material. In many embodiments, the protector 58 can include an upper edge 62, a lower edge 66 opposite the upper edge 62, a first side edge 70 extending between the upper edge 62 and the lower edge 66, and a second side edge 74 extending between the upper edge 62 and the lower edge 66 and opposite the first side edge 70. In many embodiments, and as illustrated at FIG. 3, the protector 58 can be trapezoidal shaped when in a flat, first configuration. Thus, in some of these embodiments, the upper edge 62 and the lower edge 66 can extend parallel to one another, with the protector 58 having a larger width (between first side edge 70 and second side edge 74) at the lower edge 66 than at the upper edge 62. In other embodiments, other sizes and/or shapes (e.g., square, rectangular, etc.) of the protector 58 can be implemented than the illustrated size and shape.

With continued reference to FIG. 3, in some embodiments, the protector 58 can include a first corner 78, a second corner 82, a third corner 86, and a fourth corner 90. In some embodiments, the corners 78, 82, 86, and/or 90 can be rounded, although, in other embodiments, one or more of the corners 78, 82, 86, and 90 may be squared or have otherwise shaped.

Figure 4:
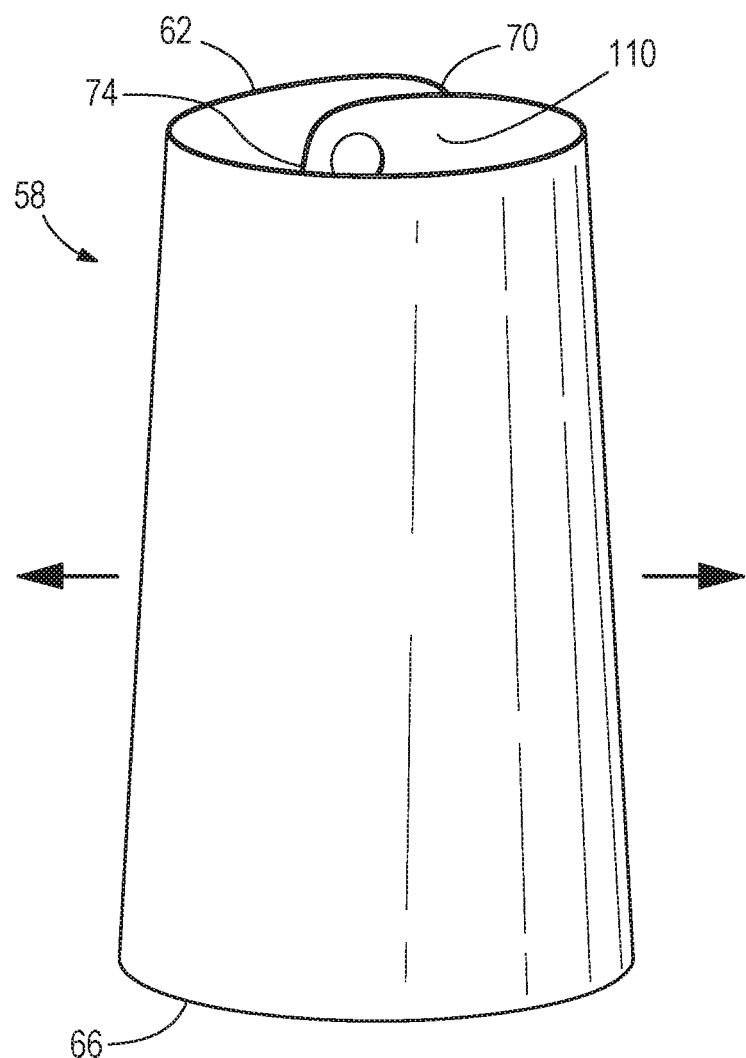
FIG. 4 is a perspective view of the protector of FIG. 3 in a second, rolled configuration.

Referring now to FIGS. 3 & 4, in many embodiments, the protector 58 can include one or more retraction features. For example, the retraction feature(s) can be configured to facilitate insertion and/or removal of the protector 58 in and/or from the frame assembly 14 and/or the head tube 34. In some embodiments, the one or more retraction feature(s) can include one or more hole(s). The retraction feature(s) (e.g., hole(s)) can be configured to receive a hook or other tool to aid in inserting and/or removing the protector 58. In some embodiments, the retraction feature(s) can be omitted.

In some embodiments, the retraction feature(s) can be located adjacent to one or more edge(s) (e.g., upper edge 62, lower edge 66, first side edge 70, and/or second side edge 74) of the protector 58. In these or other embodiments, the retraction feature(s) can be located adjacent to one or more corner(s) (e.g., corners 78, 82, 86, and/or 90) of the protector 58.

For example, in many embodiments, and as illustrated at FIG. 4, the protector 58 can include a first retraction feature 94 (e.g., a first hole) located adjacent to the first corner 78, a second retraction feature 98 (e.g., a second hole) located adjacent to the second corner 82, a third retraction feature 102 (e.g., a third hole) located adjacent to the third corner 86, and a fourth retraction feature 106 (e.g., a fourth hole) located adjacent to the fourth corner 90. The retraction features 94, 98, 102, 106 can be similar or identical to the retraction feature(s) described above. In other embodiments, the protector 58 can include retraction feature(s) having different sizes, shapes, numbers, and/or locations than the retraction feature(s) illustrated.

With continued reference to FIG. 4, during use, the protector 58 may be rolled into a second configuration, such that a portion of the protector 58 (e.g., the first side edge 70) at least partially overlaps another portion of the protector 58 (e.g., the second side edge 74). The protector 58 may be rolled, for example, into a frustoconical shape, or into other shapes where the first and second side edges 70, 74 overlap with one another and where an opening 110 is formed.

Figure 6:
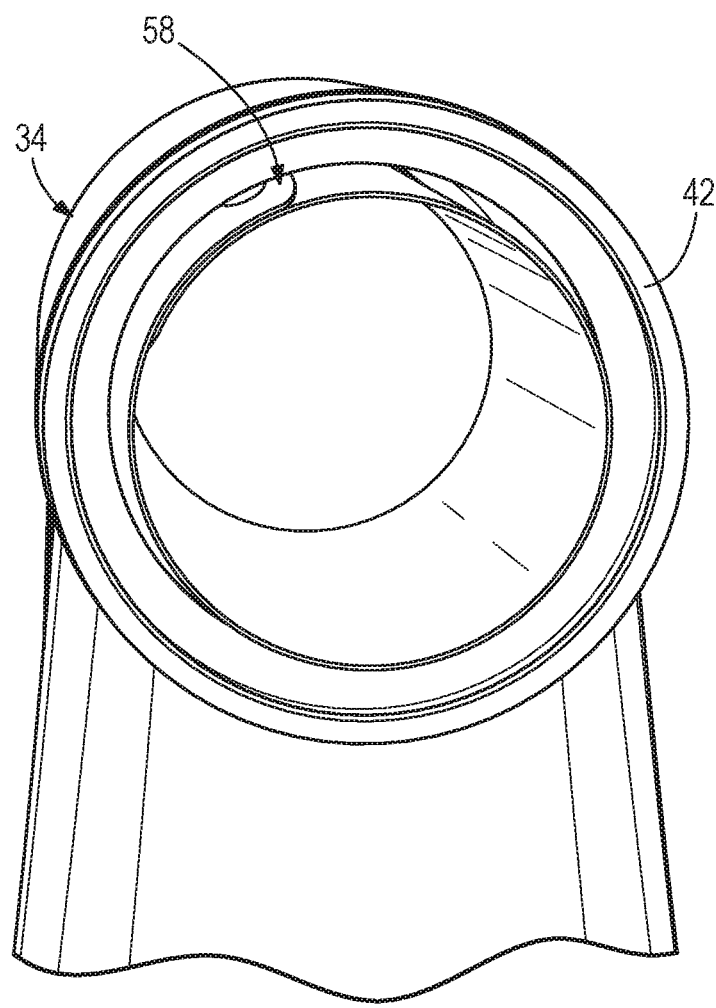
FIG. 6 is a bottom view of the head tube of FIG. 5, looking up at the protector within the head tube.

Referring now to FIGS. 5 and 6, when rolled into the second configuration, the protector 58 may be inserted into the head tube 34. As illustrated in FIG. 5, a steerer tube 114 (illustrated schematically in dashed lines) of a fork for the bicycle 10 may then be passed through the opening 110 of the rolled-up protector 58, such that the protector 58 at least partially surrounds (e.g., is wrapped around) the steerer tube 114, and is disposed radially between the steerer tube 114 and the component line housing 54. In some embodiments, and as illustrated at FIG. 5, the component line housing 54 extends from the downtube 30 into the head tube 34 through a first opening 118 in the head tube 34, and then extends out of the head tube 34 through a second opening 122 into another region of the frame assembly 14 (e.g., a top tube). The component line housing 54 is thus sandwiched, or is otherwise limited in its ability to flex and move within the head tube 34, by the presence of the protector 58. The protector 58 prevents the component line housing 54 (and one or more component line(s) within component line housing 54) from contacting the steerer tube 114, and due to the rolled-up configuration, may exert a radially outwardly extending force upon the component line housing 54 (and one or more component line(s) within component line housing 54) between the first opening 118 and the second opening 122 to press the component line housing 54 (and one or more component line(s) within component line housing 54) toward the interior surface 50 of the head tube 34. In other words, internal forces of the protector 58 resulting from bending of the protector 58 cause the protector 58 to drive the component line housing 54 (and one or more component line(s) within component line housing 54) toward the head tube 34 and away from the steerer tube 114. The protector 58 resists inward radial movement of the component line housing 54 (and one or more component line(s) within component line housing 54) within the head tube 34. While the illustrated frame assembly 14 includes both the first opening 118 and the second opening 122, in other embodiments just a single opening may be provided into the head tube 34, or more than two openings. Meanwhile, in other embodiments, the protector 58 can act directly on one or more component line(s), such as, for example, when the component line housing 54 is omitted.

Referring to FIG. 5, in many embodiments, the protector 58 can extend along a majority of a length of the head tube 34 (as measured between the first end 38 and the second end 42, such that the upper and lower edges 62, 66 of the protector 58 are positioned adjacent the upper and lower ends 38, 42 of the head tube 34, respectively. In other embodiments, the protector 58 can extend along a smaller portion (e.g., less than half) of the length of the head tube 34.

In some embodiments, the interior surface 50 can be defined in part by two radially inwardly-projecting lips or ledges 126 spaced apart from one another along the length of the head tube 34, and extending circumferentially within the head tube 34. The lips or ledges 126 may contact the protector 58. In other embodiments, the head tube 34 may not include the lips or ledges 126, and instead may have a generally flat interior surface 50 extending entirely along the length of the head tube 34. In still other embodiments, the head tube 34 can include different quantities or arrangements of the lips or ledges 126.

In many embodiments, the protector 58 is a separate element that is removable from the head tube 34. The protector 58 can thus be considered decoupled from the component line housing 54 (and one or more component line(s) within component line housing 54), but still contact at least a portion of the component line housing 54 once installed into the head tube 34. Similarly, the protector 58 can be considered decoupled from the steerer tube 114 and/or the head tube 34, but still contact at least a portion of the steerer tube 114 and/or the head tube 34 once installed in the head tube 34. In yet other embodiments, the protector 58 may be formed integrally as part of the head tube 34 itself, or fixed at one or more locations to the head tube 34.

In some embodiments, the bicycle 10 can include one or more other protectors similar or identical to the protector 58. The other protector(s) can function as similarly described for protector 58 at one or more locations within the frame assembly of the bicycle 10, such as, for example, to protect component line(s), component line housing(s), and/or other parts of the frame assembly 14, and can be implemented additionally or alternatively to the protector 58.

Various features of the invention are set forth in the following claims.

The invention claimed is:

1. A bicycle comprising:
    a frame assembly having a head tube and a fork having a steerer tube mounted for rotation in the head tube;
    wheels supporting the frame assembly;
    a component line positioned at least partially in the head tube and between the head tube and the steerer tube; and
    a protector positioned in the head tube and separating the component line from the steerer tube, wherein a first portion of the protector at least partially overlaps a second portion of the protector, wherein the protector includes a resilient sheet.

2. The bicycle of claim 1, wherein the component line is out of contact with the steerer tube.

3. The bicycle of claim 1, wherein the protector is not coupled to the component line.

4. The bicycle of claim 1, wherein the protector is not coupled to at least one of the head tube or the steerer tube.

5. The bicycle of claim 1, wherein the protector resists radial movement of the component line within the head tube.

6. The bicycle of claim 1, wherein the component line comprises a control cable, an electrical cable, or a data cable.

7. The bicycle of claim 1, wherein:
    the component line is positioned in a component line housing; and
    the protector separates the head tube and the component line housing from the steerer tube.

8. The bicycle of claim 1, wherein the resilient sheet at least partially surrounds the steerer tube.

9. The bicycle of claim 1, wherein the resilient sheet extends over a majority of a length of the head tube.

10. The bicycle of claim 1, wherein internal forces of the protector resulting from bending of the protector cause the protector to drive the component line toward the head tube and away from the steerer tube.

11. The bicycle of claim 1, wherein the overlap results in a radially outwardly extending force that is applied onto the component line.

12. The bicycle of claim 1, wherein the resilient sheet is at least partially rolled into a frustoconical shape.

13. The bicycle of claim 12, wherein an upper edge of the resilient sheet is positioned adjacent to an upper end of the head tube, a lower edge of the resilient sheet is positioned adjacent to a lower end of the head tube, and a side edge of the resilient sheet overlaps the resilient sheet.

14. The bicycle of claim 1, wherein the protector comprises a retraction feature that facilitates removal of the protector from the head tube.

15. A protector configured to be positioned in a head tube of a bicycle between a steerer tube and a component line, the protector comprising a resilient sheet having an upper edge and a lower edge and at least one of:
    at least one first retraction feature adjacent to the upper edge; or
    at least one second retraction feature adjacent to the lower edge.

16. The protector of claim 15, wherein:
    the at least one first retraction feature comprises a first hole in the resilient sheet; and
    the at least one second retraction feature comprises a second hole in the resilient sheet.

17. The protector of claim 15, wherein:
    the resilient sheet comprises a first corner, a second corner, a third corner, and a fourth corner;
    the at least one first retraction feature comprises multiple first retraction features;
    the multiple first retraction features comprise a first retraction feature adjacent to the first corner and a second retraction feature adjacent to the second corner;
    the at least one second retraction feature comprises multiple second retraction features;

the multiple second retraction features comprise a third retraction feature adjacent to the third corner and a fourth retraction feature adjacent to the fourth corner; and the first retraction feature comprises a first hole;
the second retraction feature comprises a second hole;
the third retraction feature comprises a third hole; and
the fourth retraction feature comprises a fourth hole.

18. The protector of claim 15, wherein the resilient sheet has a trapezoidal shape.

19. The protector of claim 15, wherein the protector is configured such that when the protector is located between the head tube and the steerer tube, internal forces of the protector resulting from bending of the protector cause the protector to drive the component line toward the head tube and away from the steerer tube.

20. A bicycle comprising:
a frame assembly having a head tube and a fork having a steerer tube mounted for rotation in the head tube;
wheels supporting the frame assembly;
a component line positioned at least partially in the head tube and between the head tube and the steerer tube; and
a protector positioned in the head tube and separating the component line from the steerer tube, wherein a first portion of the protector at least partially overlaps a second portion of the protector, wherein the overlap results in a radially outwardly extending force that is applied onto the component line.

* * * * *